United States Patent [19]

Miller

[11] 4,417,706

[45] Nov. 29, 1983

[54] FLYING WING DRIVEN BY AN EARTHBOUND MACHINE

[76] Inventor: Donald L. Miller, 307 Steuben St., Horseheads, N.Y. 14845

[21] Appl. No.: 215,909

[22] Filed: Dec. 12, 1980

[51] Int. Cl.³ .......................... B64C 39/00; B63H 7/02
[52] U.S. Cl. .......................................... 244/2; 244/50; 244/63; 114/273; 434/37; 440/37
[58] Field of Search ................... 244/50, 2, 51, 63, 55, 244/54; 434/30, 37; 272/1 C; 114/273, 272, 77 R; 180/116, 903; 280/1.12, 1.21; 440/53, 37, 54, 900

[56] References Cited

U.S. PATENT DOCUMENTS

| | | | |
|---|---|---|---|
| 1,386,916 | 8/1921 | Vass | 244/51 |
| 1,825,363 | 9/1931 | Robertson | 434/37 |
| 1,910,655 | 5/1933 | Traver | 244/2 |
| 1,927,938 | 9/1933 | Huffmann | 244/50 |
| 2,436,988 | 3/1948 | Bell | 244/3 |
| 2,747,819 | 5/1956 | Aldrich et al. | 440/900 |
| 3,118,411 | 1/1964 | Koriagin | 114/273 |
| 3,503,574 | 3/1970 | Eickman | 244/2 |
| 3,991,487 | 11/1976 | Bede | 244/2 |
| 4,000,712 | 1/1977 | Erikson et al. | 114/77 R |

FOREIGN PATENT DOCUMENTS

| | | | |
|---|---|---|---|
| 980030 | 5/1951 | France | 244/63 |
| 996477 | 6/1965 | United Kingdom | 440/37 |

Primary Examiner—Galen L. Barefoot
Attorney, Agent, or Firm—Remy J. VanOphem

[57] ABSTRACT

A flying craft which is pushed by a surface vehicle which follows the flying craft is disclosed. The craft includes a winged body which is connected by an elongated push pole to a ground engaging propelling vehicle. The control of the winged body is accomplished by changing the vertical position of one end of the elongated push pole relative to the opposite end of the flying craft. The surface vehicle limits the angle which the pole makes relative to the surface to prevent the surface vehicle from overtaking the flying craft.

10 Claims, 12 Drawing Figures

FLYING WING DRIVEN BY AN EARTHBOUND MACHINE

FIELD OF THE INVENTION

The present invention relates to an aircraft propelled by a surface vehicle and, more specifically, to an aircraft connected by a push tube to a land vehicle.

BACKGROUND OF THE INVENTION

Men have always wanted to fly like the birds. It was only in 1783 that man first achieved flight when the Montgolfier Brothers filled a balloon with hot air. Many people tried to copy the birds by fitting wings to their arms and flapping them. They did not fly because the muscles in man's chest and shoulders are simply not strong enough to provide the necessary lift and propulsion.

Sir George Caley had a better idea in that he built gliders which could carry a pilot. However, he found that this was not entirely satisfactory since he could not control the movements of the glider completely. Next, other men tried to propel their gliders with steam engines. The steam engines, however, were much to heavy and the planes could not take off.

Otto Lilienthal built many gliders and made over two thousand test flights. He thought of fitting a small engine to one of the gliders but he died before he could test his idea.

The first men known to fly in an airplane driven by an engine were Orville and Wilbur Wright. Orville Wright made the world's first powered flight on Dec. 17, 1903 at Kittyhawk, N.C. which lasted 12 seconds.

Since that time airplanes have been developed for use in wars, on land and in the sea. They have been used to fly commercial freight and passengers. With these developments, airplane flight has become increasingly available to the common working man. As a result, many thousands of people currently own their own aircraft and enjoy flying in their own airplanes and gliders for sport and for transporation. One only need to look around a local airport to see the number of small aircraft utilized for business and pleasure today.

With the increase in the number of people flying, it was found necessary to impose licensing and other regulations on pilots. One agency charged with this responsibility in the United States is the Federal Aviation Administration. Thus, regulations have been promulgated such as minimum distances of airports to residential homes, minimum flight clearances, weather related restrictions and instrumentation requirements in the interest of public safety.

One such regulation mandates that pilots who have had heart attacks are not able to pilot airplanes alone and requires the presence of a second qualified pilot in the cockpit if the pilot has had a heart attack. This requirement has severely restricted the personal flying time available to those pilots who have had a history of heart attacks. Because of this, many pilots who might otherwise experience the joy of flight on a regular basis must severely curtail their flight time unless a second qualified pilot can be found to share the cockpit with them.

One solution to this problem, that has been suggested previously in the prior art, has been to either pull or tow the airplane by a land based vehicle. There are several known prior art designs which disclose airplanes either pulled or towed by land based vehicles. One example is shown in U.S. Pat. No. 1,825,363 to Robertson. Robertson discloses a seaplane which is pivotally connected by rigid arms to a small boat or sled that is provided with a power source such as an outboard motor. The small boat is provided with its own motor and the arms propel the plane while the seaplane is in the water or in the air. The seaplane is capable of carrying two people and is connected to a sled to permit the pilot in the seaplane to manipulate elevators for causing the seaplane to lift clear of the water when it has obtained sufficient speed. The outboard motor can be started by one of the passengers in the plane by means of a cord which extends from the plane back to the outboard motor in the sea sled. The fuel and spark control for the motor are extended by arms to the fuselage of the airplane where they may be reached by the pilot to control the speed of the motor of the sled. Other such similar prior art devices are shown in U.S. Pat. No. 3,750,978 to Cunningham and U.S. Pat. No. 3,614,024 to Milmann.

Eickmann in U.S. Pat. No. 3,503,574 discloses a fluid power operated vehicle. Eickmann has fluid power producing means which are positioned in a base unit for supplying pressurized fluid to fluid motors located in the flying vehicle for rotating propulsion elements, such as propellers, which determine the altitude and movement of the flying vehicles. The power producing means in the fluid motor are interconnected by fluid passageways for circulating the pressurized fluid to the fluid motor and then returning the fluid to the power producing means. The control of the altitude and movement of the flying vehicle are positioned in either the flying vehicle or the base vehicle as required. Several arrangements of the vehicle groups and connecting means are provided so that one can be pulled or towed by the other.

All of the above cited prior art designs, however, have either complicated aerodynamic controls or complex fluid systems. In addition, they are limited exclusively either to use with land base vehicles or sea based vehicles. Furthermore, none of the aforementioned designs provides a simple, inexpensive, piloted flying craft which is connected to a craft on the ground surface which simulates the joy of flying to those pilots restricted by health requirements or other sports minded individuals who do not have a pilot's license.

SUMMARY OF THE INVENTION

The present invention provides a piloted flying craft which overcomes all of the aforesaid disadvantages and provides a piloted flying craft which is pushed by a surface vehicle so that the joys of flying alone may be enjoyed by pilots having a medical history of heart attacks or other sports minded individuals who have not qualified for a pilot's license.

The present invention is directed to a piloted flying craft which is connected to a craft on the planet surface. The craft includes a winged body having a front end, an opposite end, and a pilot compartment adjacent to the front end. A mechanism, contiguous with the planet surface and connected to the opposite end of the winged body, propels the winged body in the air vertically relative to the planet's surface. The propelling mechanism further follows the winged body. Finally, a mechanism is provided for controlling the line of thrust of the winged body by slidably adjusting connection of the propelling mechanism relative to the winged body.

It is, therefore, a primary object of the present invention to provide a piloted flying craft which is connected to a surface vehicle by means of a push pole such that control of the winged craft is accomplished by changing the vertical position of one end of the push pole relative to the center gravity of the winged craft.

It is another object of the present invention to provide a piloted flying craft which is rigidly fastened to a surface vehicle by means of a push pole and which permits a single pilot to fly the craft over land and water.

It is yet still another object of the present invention to provide a flying craft which is rigidly connected to a surface vehicle which pushes the flying craft regardless of the speed of the land vehicle and which permits vertical control of the flying craft provided the land vehicle is pushing the flying craft.

It is yet still another object of the present invention to provide a flying craft which is rigidly connected to a surface craft which surface craft follows the flying craft and limits the angle which the pole makes relative to the surface to prevent the flying craft from being overtaken by the surface vehicle.

These and other objects of the present invention will become apparent upon reading the specification in conjunction with the drawings.

DESCRIPTION OF THE PREFERRED EMBODIMENT

Figure 1:
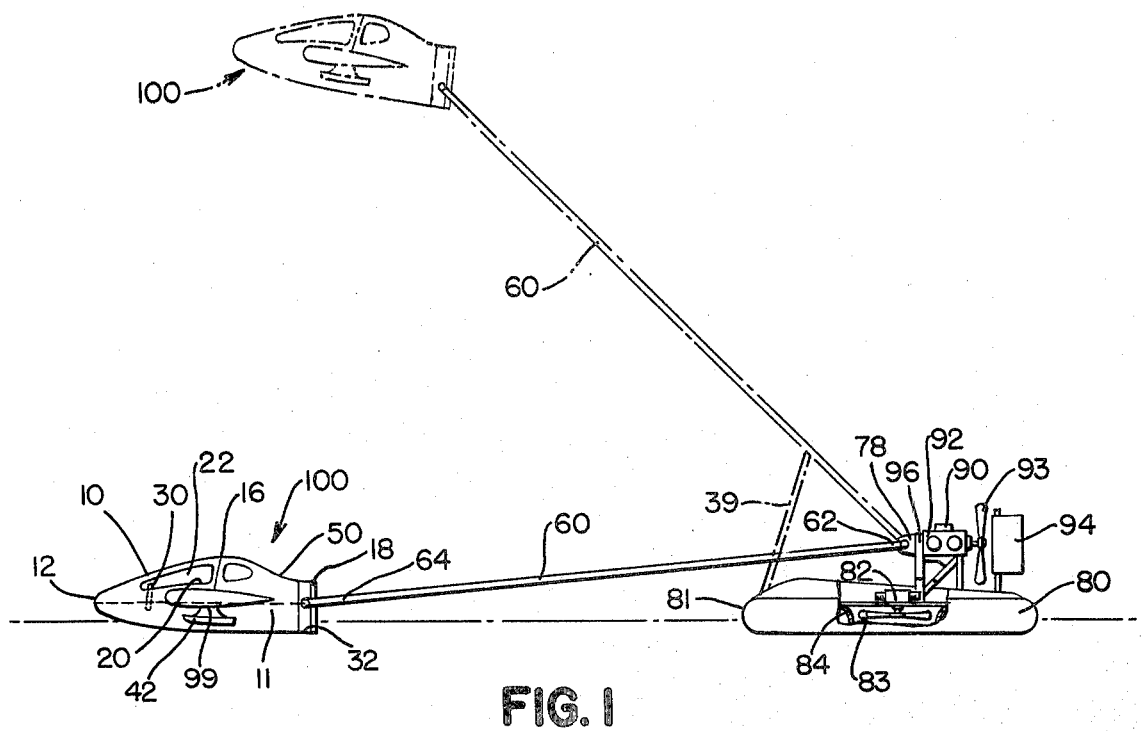
FIG. 1 is a side planar view of the flying craft according to my invention.
Figure 2:
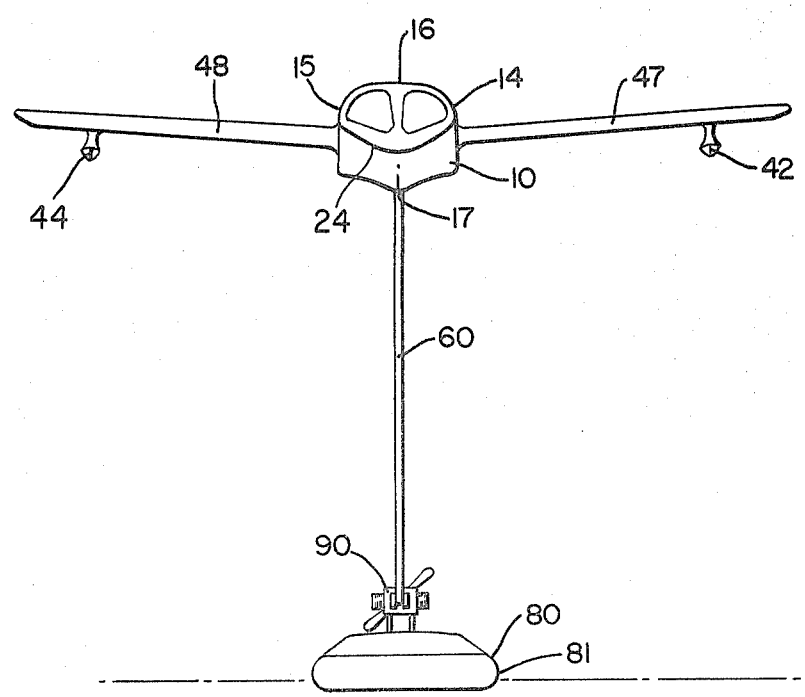
FIG. 2 is a frontal view of FIG. 1.
Figure 3:
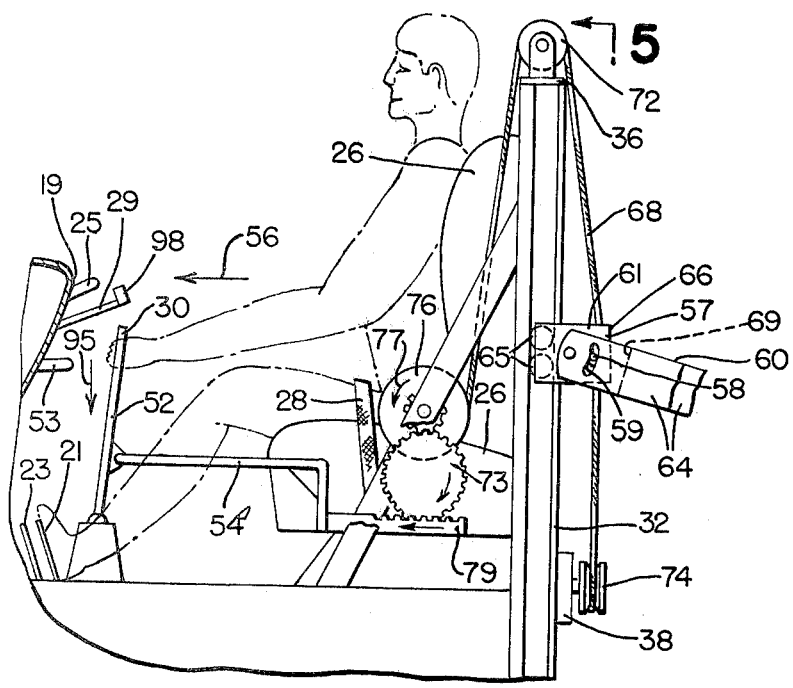
FIG. 3 is a side view of the control mechanism for raising and lowering the flying craft according to my invention.
Figure 4:
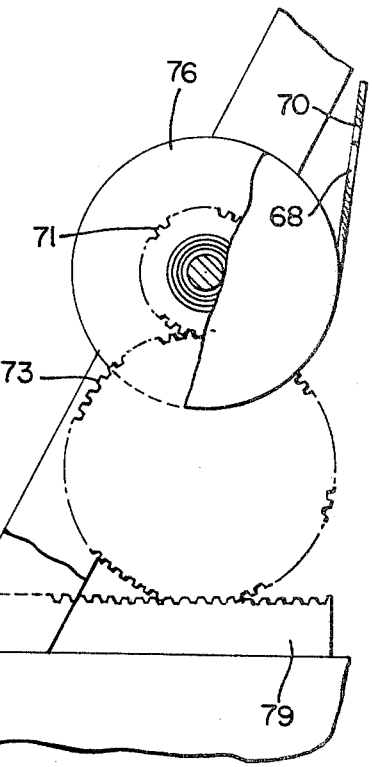
FIG. 4 is an enlarged view of the gear and drum of FIG. 3.
Figure 5:
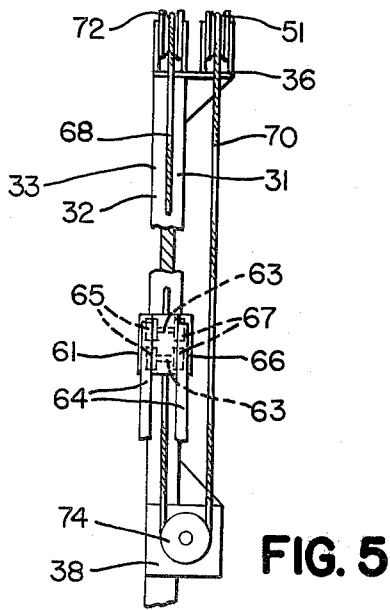
FIG. 5 is a rear view of FIG. 4.

The piloted flying craft, according to my invention, is shown in FIG. 1 and is generally designated by the numeral 100. The flying craft 100 includes a winged body means 50 and a propelling means 90.

As shown in FIGS. 1 through 5, the winged body means 50 includes a winged body or craft 10 having a pilot's compartment 20 disposed between a front end 12 and an opposite end 18. The pilot's compartment or cockpit 20 includes a windshield 22 which is pivotally mounted to the winged body 10 by means of a hinge support at the top end 16 of the craft. The windshield is suitably secured to the winged body 10 by means of appropriate latches, not shown, at the lower end 24. The pilot's compartment 20 also includes a pilot seat 26 suitably secured to the bottom of the pilot's compartment 20. The pilot seat includes seat belts 28 to secure the pilot to the pilot seat 26. The pilot's compartment 20 also includes control means 30 which will be described later on herein. The pilot's compartment 20 also has instrument means mounted on a dashboard 19.

The winged body 10 also has a pair of wings mounted to the sides of the winged body. Thus, one wing 47 is mounted to one side 14 of the winged body 10 while the other wing 48 is mounted to the opposite side 15 of the winged body or craft 10. The winged body or craft 10 further has a bottom end 17 which has the form of a boat bottom so as to permit the winged body or craft 10 to float in water. For this purpose, the one wing 47 has a first pontoon 42 while the other wing 48 has a second pontoon 44 mounted thereto to provide floating support to the wings and the craft as is well known in the sea plane prior art. The pontoons and boat bottom have retractable wheels to permit landing the winged body 10 on a ground surface. The opposite end 18 of the winged body or craft 10 further has a pair of vertical tracks 32 for a purpose to be described herein later.

The propelling means 90 in the preferred embodiment includes a hovercraft 80. The hovercraft 80 has a flexible skirt 81 which is fastened around its periphery. The hovercraft 80 also has a first engine 82 which is suitably mounted to a hovercraft so that the propeller 83, which is attached to the first engine 82, directs a flow of air towards the ground surface through a duct 84. The first engine thus blows air to the bottom of the hovercraft towards the ground surface to cause the hovercraft to fill the flexible skirt 81 with air so as to lift up the hovercraft on a cushion of air as is well known in the hovercraft prior art. The hovercraft 80 also has a second engine 92, a propeller 93 attached to the second engine 92 and a rudder 94. The second engine 92 is mounted horizontally to the hovercraft by means of brackets 96 and suitable fasteners such as bolts. The second engine 92 is further mounted such that the propeller 93 blows air over the rudder 94. The rudder 94 is pivotally mounted behind the propeller 93. At the front of the engine is a pivot mount 78. A push tube 60 is connected at one end 62 to the pivot mount 78 and at its other end 64 in the vertical track 32 of the winged body 10. The pivot mount 78 in the preferred embodiment limits the angular rotation of the push tube relative to a horizontal plane by a third cable 39 such that the hovercraft 80 follows the winged body 10 in order to prevent the winged body from being overtaken by the hovercraft 80. The other end 64 of the push tube 60 has a sliding member 66 which is suitably secured to the other end 64 of the push tube 60. The sliding member 66 includes a first pair of bearing members 65, a second pair of bearing members 67, and a bearing mounting member 61. Each of the sliding members are mounted for rotation on shafts 63. The shaft 63 of each of the sliding members are then suitably mounted to a bearing mounting member 61. The bearing members are mounted on shafts 63 with the shafts of the first pair of bearing members 65 mounted adjacent to each other on one side of the bearing mounting member 61 and the shaft of the second pair of bearing members 67 are mounted adjacent to each other on the opposite side of the bearing mounting member 61. The sliding members 66 are preferably caged ball bearings members mounted between inner and outer races as is well known in the bearing member prior art. The sliding member 66 cooperatively engage a pair of vertical tracks 32. The vertical tracks 32 are mounted one adjacent to the other to the opposite end of the winged body 10. The first pair of bearing members 65 are mounted in the bearing mounting member 61 for sliding and rolling contact with a first surface 33 of one of the pairs of vertical tracks 32. The second pair of bearing members 67 are mounted in the bearing mounting member 61 for sliding and rolling contact with the second surface 31 of the other of the pair of vertical tracks 32. The bearing mounting member 61 has an extending portion 57 which mounts into a larger aperture 69 in the other end 64 of the push tube 60 by means of an arcuate slot 59 on the one side and the opposite side of the bearing mounting member 61. Through the arcuate slot on each side of the bearing mounting member 61 is disposed a pin 58 which is fastened to the push tube 60 through the aperture 69. Thus, the bearing mounting member 61 is able to move angularly relative to the other end 64 of the push tube 60 because the extending portion 57 is able to move within the aperture 69 to the extent of the movement of the pin 58 in each arcuate slot 59. This permits the winged craft to rotate vertically relative to the other end 64 of the push tube within the limits of the pin 58 in the limits of the shape and size of each arcuate slot 59.

The pilot controls the relationship of the sliding member 66 in the pair of vertical tracks 32 by means of the control means 30. The control means 30 includes a first cable 68, suitably secured to the sliding member 66, and a second cable 70 which is mounted opposite to the first cable to the sliding member 66. The first cable 68 extends from the sliding member 66 towards the top 36 of the pair of vertical tracks 32. The second cable 70, on the other hand, extends from the sliding member 66 to the bottom 38 of the pair of vertical tracks 32. At the top 36 of the pair of vertical tracks 32 are mounted a first pulley wheel 72 and a third pulley wheel 51 mounted adjacent to the first pulley wheel 72. Similarly, a second pulley wheel 74 is mounted to the bottom 38 of the pair of vertical tracks 32.

A cable drum 76 is mounted for rotation in the winged body 10 so as to be adjacent to the pair of vertical tracks 32. The first cable 68 extends from the sliding member 66 to the top 36 of the pair of vertical tracks 32 so as to engage the first pulley wheel 72 and thence the first cable 68 is wound around the cable drum 76. Similarly, the second cable 70 extends from the sliding member 66 to the bottom 38 of the vertical tracks 32 so as to engage the second pulley wheel 74 and extends vertically to be wound around the third pulley wheel 51 and thence to the cable drum 76. Both the first cable 68 and the second cable 70 are suitably fastened to the cable drum so that as the cable drum rotates in direction 77, the first cable 68 unwinds from the cable drum 76 to permit the sliding member 66 to move its position towards the bottom 38 of the pair of vertical tracks 32 and at the same time the second cable 70 winds around the cable drum 76 to pull the sliding member 66 towards the bottom 38 of the pair of vertical tracks 32. On the other hand, when the cable drum 76 is rotated in a direction opposite to the direction 77, the sliding member 66 moves towards the top 36 of the vertical tracks 32 by winding the first cable 68 around the drum and unwinding the second cable 70 from the drum. The drum is prevented from rotation by a clutch 75 which is suitably activated by mechanical means (not shown). In the preferred embodiment, a bidirectional no-backup clutch is used. The bidirectional no-backup clutch is a coaxial device with two normally engaged springs working in tandem. Rotating the input shaft in either direction causes one spring to unwind and overrun, allowing direct mechanical drive of the output shaft in the same direction. When torque is removed from the input, the output shaft is automatically locked in both directions by one spring expanding into the stationary housing. Such clutches are well known in the prior art.

The drum 76 is rotated by means of first gear means 71 interacting with second gear means 73. The second gear means is suitably mounted to the winged body 10 adjacent to the vertical track 32 so as to interact with the first gear means 71 which is fixedly mounted to the drum 76 for rotation therewith.

The second gear means 73 interacts with a flat gear toothed sector 79 which is suitable mounted on a flat pedestal which is suitably mounted to the floor of the winged body 10 adjacent to the vertical track 32. The flat toothed sector 79 is rigidly connected by a rod 54 to the control means 30 which includes a control stick 52 which is pivotally mounted to the winged body or craft in the pilot's cockpit 20. The control stick 52 is attached by means of a rod 54 to the gear tooth sector 79 such that when the control stick 52 is moved in direction 56 toward the front end of the winged body 10, the gear toothed sector 79 causes the first gear means to rotate which in turn rotates the second gear means to rotate the cable drum 76 in direction 77. Similarly, moving the control stick 52 in the direction opposite to the direction 56 causes the cable drum to move in a direction opposite to direction 77. Thus, the pilot by moving the control stick 52 either in direction 77 or opposite to direction 77, changes the contact point of the sliding member 66 in the pair of vertical tracks 32 in order to control the force transmitted by the propulsion propelling means through the push tube 60 to the winged body 10 as will be more fully discussed hereinafter.

Figure 6:
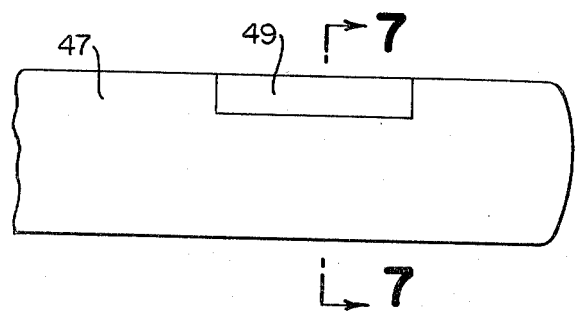
FIG. 6 is a top view of one wing.
Figure 7:
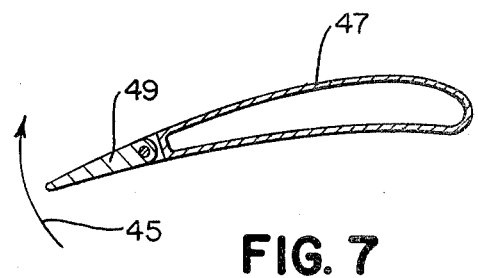
FIG. 7 is a sectional view of the wing in FIG. 6 along 7—7.
Figure 8:
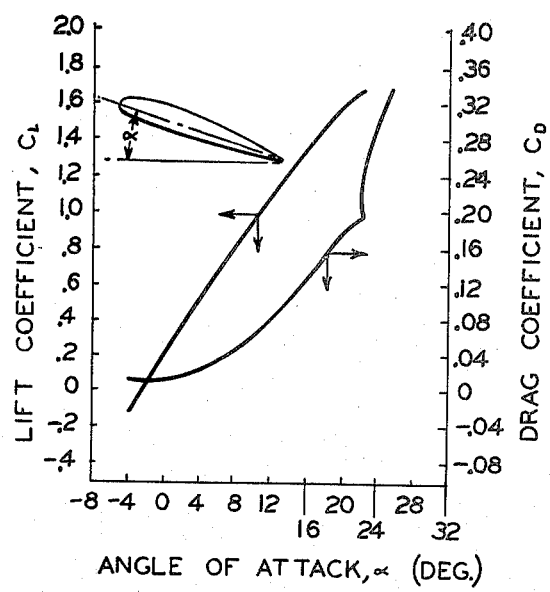
FIG. 8 is a typical lift and drag coefficient curve for an air foil.

The pilot may also control aerodynamic surfaces of the wing in order to provide him with added control of the winged body 10. To accomplish this, each wing is provided with an aileron 49 as is shown in FIG. 6. The aileron causes the necessary forces to be produced to induce rotation of the winged body relative to its longitudinal axis 11 which extends from the front end 12 to the opposite end 18. An aileron is employed to correct rotations of the winged body which are produced unintentionally such as by wind gusts. When the aileron is not used to correct wind gusts, it may be used to cause the winged body to maneuver up or down relative to the ground surface. The aileron 49 is a flap inserted in an opening in the trailing edge of each of the wings. The one edge of each of the flaps is attached to a shaft so that the flap is rotatable about its one edge in the direction 45 to change the pressure on that portion of the wing within which the aileron operates. When the winged body has reached the desired height, the ailerons are returned to a neutral position. The aileron also operates as a flap which extends the ailerons 49 past the trailing edge of each wing. Thus, the flaps are made extendible by hydraulic means (not shown) as is well known in the aircraft control prior art by actuation lever means 53 located in the cockpit 20. When the ailerons 49 are rotated in the direction 45, drag on the aileron is increased and the lift coefficient is increased to provide control during most speed landings and take offs of the winged body. As is shown in FIG. 8, the lift coefficient and drag coefficient on a wing depends on the angle of attack of the free stream air in relationship to the longitudinal axis of the wing. The ailerons are controlled by moving the control stick from side to side. Thus, when the control stick 52 is moved to one side 14 of the winged body 10, it actuates one aileron, and moving the control stick 52 to the opposite side 15 actuates the other aileron as is well known in the aircraft control prior art.

Figure 9A:
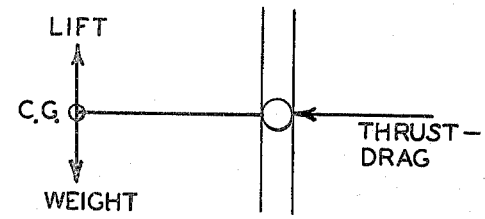
FIGS. 9a–9c are a diagramatical representation of the forces on the flying craft according to my invention.
Figure 9B:
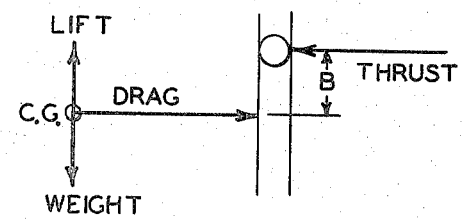
Figure 9C:
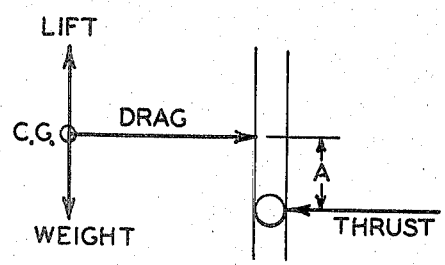

In addition to the aerodynamic surfaces on the wings, the pilot utilizes the interaction of the sliding member 66 relative to the longitudinal axis of the winged body in order to further control the craft. As is shown in FIG. 9a, when the thrust or propulsion force being transmitted by the sliding member 66 from the propelling means 90 coincides with the center of gravity of the winged body 10, which is located along its longitudinal axis, the aircraft has a tendency to fly level. However, when the spherical body is displaced, an increment B, as shown in FIG. 9b, from the longitudinal axis 11 passing through the center of gravity of the winged body 10, there is a tendency to point the front end 12 of the winged body 10 towards the ground surface. On the other hand, as is shown in FIG. 9c, when the thrust is displaced, an increment A below the center of gravity and the longitudinal axis of the winged body 10, the craft 10 has a tendency to pull up, that is, move the front end 12 away from the surface of the earth. Those skilled in the art will recognize that the center of gravity is the theoretical point at which the weight of the crafts acts on the winged body 10.

The pilot's compartment 20 further has pedals 23 mounted therein which are either mechanically, hydraulically or electrically connected to the rudder 94 so as to induce directional motion to the pusher and wings. In addition, first switch means 25 is mounted in compartment 20 and is suitably connected to the first engine in order to start and control the speed of the first engine 82. Second switch means are also mounted in the pilot's compartment 20 and are similarly connected to the second engine 92 to start and control the speed of the second engine 92 by throttle means 98. The pair of pedals are connected by conventional hydraulic means (not shown) to actuate the rudder 94 such that by pressing the first pedal 23, the rudder 94 is caused to move in the direction 95 by pressing the second pedal 21 and the rudder 94 is caused to move in a direction opposite to direction 95. In addition, moving the lever means 53 in the direction 37 extends the ailerons 49 to become flaps when taking off or landing the winged craft 10. Furthermore, after the winged craft is flying, the movement of the control stick 52 from side to side actuates the ailerons 49. Also, as discussed before, by moving the control stick 52 in direction 56, the pilot causes the front end 12 to move away from the surface of the earth. Thus, the pilot has all the necessary controls in the pilot's compartment 20 to control both crafts. The controls in the winged body are disposed in the push tube 60 and thence connected to the propelling means 90 by suitable connectors.

OPERATION

When the pilot desires to use the flying craft 100 he enters the pilot compartment 20, sits in the pilot seat 26 and utilizing the safety belt 28 secures himself to the winged body 10.

The pilot then activates the first switch means 25 to start the first engine 82. The first engine 82 then rotates the propeller 83 in the duct 84 to blow a quantity of air towards the surface of the earth through the skirt 81 of the hovercraft 80. This causes a cushion of air to develop between the hovercraft 80 and the earth's surface so that the hovercraft is then operational on a cushion of air. In order to propel himself, the pilot then activates the second switch means 29 which causes the second engine 92 to become operational. The second engine 92 thus rotates the propeller 93 which blows a quantity of air over the rudder 94 to develop thrust which is transmitted through the pivot mount 78 into the push tube 60 and thence through the sliding member 66 to the winged body 10 to cause the flying craft and the hovercraft 80 to thus move forward. The pilot then places his feet on rudder pedals 21, 23 which permit him to move the rudder 94 in the direction he wishes to move. In order to move vertically with regard to the surface of the earth, the pilot then pulls the control stick 52 in the direction 56 which causes the flat gear toothed sector 79 to move relative to the second gear means 73 thereby causing the second gear means 73 to rotate and pushed the lever means 53 to extend the flaps. When the second gear means 73 rotates, it engages the first gear means 71 to cause the cable drum 76 to move in direction 77. This in turn, causes the first cable to unwind from the drum thereby permitting the sliding members 66 to move towards the bottom 38 of the pair of vertical tracks 32. At the same time, the second cable is wound around the cable drum 76 to cause the sliding members 66 to move towards the bottom 38 of the pair of vertical tracks 32. At the same time, the pilot controls the movement of the winged body 10 through the ailerons 49 by moving the control stick 52 from side to side. If the pilot chooses to fly level, he merely positions the control stick such that the sliding members acts through the longitudinal axis 11 and the center of gravity of the winged body or craft. On the other hand, when the pilot desires to have his craft descend toward the ground surface, he positions the sliding members towards the top 36 of the pair of vertical tracks 32 to cause the thrust level of the propelling means to be positioned in the vertical track at a distance above the center of gravity of the craft. In the event that the aerodynamic forces over the wing are insufficient to provide adequate lift when the pin moves against the slot of the bearing support member, the reaction forces from the hovercraft are transmitted to the winged body. Thus, a reaction torque is transmitted to the wings to provide greater control on the winged body at lower speed then is generally available with only aerodynamic forces acting on a flying craft.

The pilot can control the flying craft 100 in the horizonatal plane by moving the rudder pedals 21 and 23 which causes the rudder 94 to move and react on the winged body causing it to turn in the direction 95. Additionally, the pilot controls the position of the winged craft relative to the longitudinal axis 11 of the winged body or craft 10 by moving the control stick 52 from side to side which actuates the ailerons 49. To control the speed of the flying craft 100, the pilot regulates the engine speed of the second engine by adjusting the throttle means 98.

Thus, the push pole in the sliding member is controlled by the pilot such that the sliding member moves in a vertical plane to change the position of the thrust line relative to the center of gravity of the flying craft 100. This in turn either causes the winged body 10 to position its front end 12 towards the surface of the earth or away from the surface of the earth regardless of the speed of the propelling means as long as there is thrust from the propelling means. In the event that the second engine 92 runs out of fuel or stops, the pilot moves the control stick 52 in the appropriate fashion to move the push pole relative to the winged body 10 to take the necessary corrective action to control the descent of the winged craft to the ground surface. In addition, push pole angular rotation with regard to the pivot mount 78 is limited in the preferred embodiment to an angle from the horizontal so that the propelling means always follows the winged body 10.

It should be noted that the track is pivotally mounted to the rear end of the winged body 10 and rotatably connected to the aileron control as by a mechanical linkage (not shown). Thus, when necessary (as for example—due to an aerodynamically stalled aileron) a mechanical rotating reaction is transmitted to the winged body from the hovercraft by the further movement of the control stick acting on the ailerons beyond the normal limits of the control stick to control the ailerons. This added movement of the control stick permits the control of the altitude of the nose of the winged craft speeds below the aerodynamic stall speed of the wings.

Figure 10:
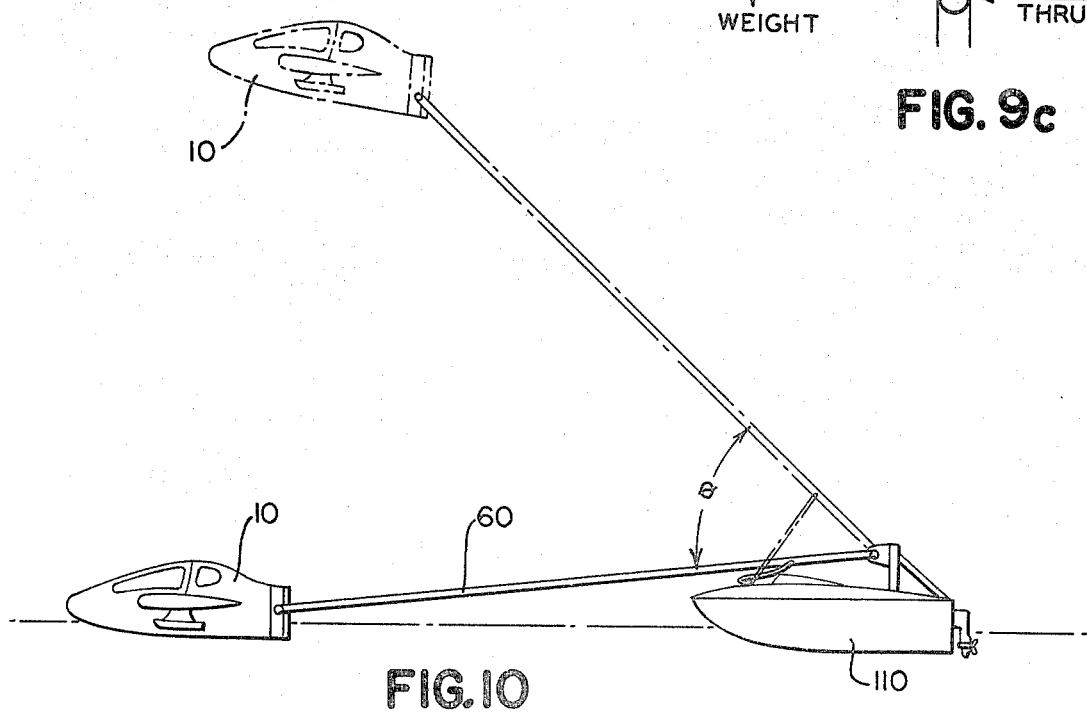
FIG. 10 is a side planar view of an alternate embodiment according to my invention.

In an alternate embodiment shown in FIG. 10, wherein like parts are designated with like numerals throughout, the winged body 10 is pushed by the push pole 60 which is in turn pivotally mounted to a boat 110. The operation of this alternate embodiment is similar to the preferred embodiment except that the boat does not have a first engine to provide an air cushion underneath the boat. Thus, the boat 110 merely moves through the wate in a similar manner as the hovercraft would.

While the invention has been described in connection with a preferred embodiment, it is to be understood it is not intended to limit the invention to that embodiment. On the contrary, it is intended to cover all alternatives, modifications and equivalents as may be included within the spirit and scope of the invention as defined by the appended claims.

What is claimed is:

1. A piloted flying craft which is connected to a surface vehicle, said piloted craft comprising:
   a winged body having a front end, an opposite end, a pilot compartment adjacent to said front end, a vertically displaceable connection means attached to said opposite end, and a longitudinal axis entending from said front end to said opposite end;
   push tube means, mounted between the surface vehicle and said winged body, said push tube means being connected to said connection means for propelling said winged body in the air vertically relative to the ground surface, said push tube means further defining a line of thrust applied to said winged body due to the motion of the surface vehicle; and
   means for controlling the line of thrust defined by said push tube by vertically adjusting the position of the connection means relative to said longitudinal axis of said winged body.

2. A piloted flying craft as claimed in claim 1 further comprising:
   means for angularly limiting the position of said winged body relative to said surface vehicle such that said surface vehicle follows said winged body.

3. A piloted flying craft as claimed in claim 2 wherein said surface vehicle is a hovercraft.

4. A piloted flying craft as claimed in claim 2 wherein said surface vehicle is a boat.

5. A piloted flying craft comprising;
   a winged body having a front end, an opposite end and a pilot compartment adjacent said front end, said winged body further having one side extending from said front end to said opposite end, a second side opposite said one side and a pair of wings extending from said winged body, one of said pair of wings projecting from said one side and the other of said pair of wings projecting from said opposite side, said pilot compartment having control means therein;
   a surface vehicle disposed following said winged body, said surface vehicle having propelling means for moving said surface vehicle relative to the ground;
   an elongated push pole disposed between said winged body and said surface vehicle, said elongated push pole having a first end and a second end opposite to said first end;
   first means for pivotally connecting said first end of said elongated push pole to said opposite end of said winged body;
   second means for pivotally connecting said second end of said elongated push pole to said surface vehicle such that said winged body rises vertically relative to said surface vehicle;
   means for angularly limiting said elongated pole angular movement relative to said surface vehicle such that said surface vehicle follows said winged body; and
   said control means adjusts the line of thrust relative to said opposite end of said winged body by vertically adjusting said first pivotally connecting means relative to said opposite end of said winged body.

6. A piloted flying craft as claimed in claim 5 wherein the motion of said surface vehicle relative to the ground defines a line of thrust to said opposite end of said winged body.

7. A piloted flying craft as claimed in claim 5 further comprising means for preventing said winged body from rotating angularly about said longitudinal axis.

8. A piloted flying craft as claimed in claim 7 further comprising means for limiting the pivotal rotation of said opposite end of said winged body relative to said first end of said elongated push pole.

9. A piloted flying craft as claimed in claim 8 wherein said surface vehicle is a hovercraft.

10. A piloted flying craft as claimed in claim 8 wherein said surface vehicle is a boat.

* * * * *

UNITED STATES PATENT AND TRADEMARK OFFICE
CERTIFICATE OF CORRECTION

PATENT NO. : 4,417,706

DATED : November 29, 1983

INVENTOR(S) : Donald Leroy Miller

It is certified that error appears in the above-identified patent and that said Letters Patent is hereby corrected as shown below:

Column 8, line 14, "pushed" should read -- pushes --.

Column 9, line 27, "wate" should read -- water --.

Signed and Sealed this

Tenth Day of December 1985

[SEAL]

Attest:

Attesting Officer

DONALD J. QUIGG

Commissioner of Patents and Trademarks